United States Patent [19]
Lee

[11] Patent Number: 5,429,664
[45] Date of Patent: Jul. 4, 1995

[54] PRESSURE SWING ABSORPTION WITH RECYCLE OF VOID SPACE GAS

[75] Inventor: Sang K. Lee, Allentown, Pa.

[73] Assignee: Air Products and Chemicals, Inc., Allentown, Pa.

[21] Appl. No.: 197,091

[22] Filed: Feb. 16, 1994

Related U.S. Application Data

[63] Continuation-in-part of Ser. No. 20,507, Feb. 22, 1993, abandoned.

[51] Int. Cl.⁶ .................... B01D 53/053; B01D 53/22
[52] U.S. Cl. .......................... 95/54; 95/103; 95/138; 95/903
[58] Field of Search ............ 95/97, 103, 138, 148, 95/903, 45, 54, 96, 100–102, 105

[56] References Cited

U.S. PATENT DOCUMENTS

| | | | |
|---|---|---|---|
| 3,085,379 | 4/1963 | Kiyonaga et al. | 95/96 |
| 3,738,087 | 6/1973 | McCombs | 55/58 |
| 3,801,513 | 4/1974 | Munzner et al. | 252/421 |
| 3,923,477 | 12/1975 | Armond et al. | 95/103 |
| 4,256,469 | 3/1981 | Leitgeb | 55/25 |
| 4,264,339 | 4/1981 | Juntgen et al. | 55/25 |
| 4,348,213 | 9/1982 | Armond | 55/25 |
| 4,415,340 | 11/1983 | Knoblauch et al. | 55/25 |
| 4,566,881 | 1/1986 | Richter et al. | 95/98 |
| 4,701,187 | 10/1987 | Choe et al. | 95/54 X |
| 4,705,541 | 11/1987 | Sircar | 95/98 |
| 4,717,407 | 1/1988 | Choe et al. | 62/18 |
| 4,765,804 | 8/1988 | Lloyd-Williams et al. | 55/16 |
| 4,775,394 | 10/1988 | Yamano et al. | 95/101 |
| 4,783,203 | 11/1988 | Doshi | 95/54 X |
| 4,853,004 | 8/1989 | Kaplan et al. | 55/25 |
| 4,915,711 | 4/1990 | Kumar | 95/101 |
| 4,925,461 | 5/1990 | Gemba et al. | 55/26 |
| 4,986,835 | 1/1991 | Uno et al. | 95/99 |
| 5,026,406 | 6/1991 | Kumar | 95/101 |
| 5,084,075 | 1/1992 | Sircar | 95/103 X |
| 5,163,978 | 11/1992 | Leavitt et al. | 95/96 X |
| 5,207,806 | 5/1993 | Lagree et al. | 95/54 X |

Primary Examiner—Robert Spitzer
Attorney, Agent, or Firm—Geoffrey L. Chase; William F. Marsh

[57] ABSTRACT

The present invention is a pressure swing adsorption process for separating a more strongly adsorbed gas component from a less strongly adsorbed gas component in a feed gas mixture at higher recoveries and productivity and less capital cost by the use of void space gas recycle, membrane based nitrogen enrichment of feed gas and the elimination of pressure equalization steps. The process is particularly amenable to air separation wherein nitrogen product is recovered and an oxygen byproduct is removed.

11 Claims, 3 Drawing Sheets

PRESSURE SWING ABSORPTION WITH RECYCLE OF VOID SPACE GAS

This application is a continuation-in-part of U.S. Application Ser. No. 08/020,507, filed Feb. 22, 1993, now abandoned.

TECHNICAL FIELD

The present invention is directed to adsorptive separations wherein void space gas in an adsorption zone to be regenerated is removed and recycled to the feed to the process. More specifically, the present invention is directed to an adsorptive air separation wherein nitrogen is the less readily adsorbed gas component and the nitrogen rich void space gas in an adsorption zone is removed during initial depressurization and recycled to the feed air prior to compression. Subsequent depressurization gas may be used as a sweep gas to enhance membrane enrichment of the feed gas to the process.

BACKGROUND OF THE PRIOR ART

Adsorptive separations using carbon molecular sieves as adsorbents are well known in the prior art for resolving various gas mixtures, including air. Such separations are predicated upon the compositions of the gas mixtures and the components' selectivity for adsorption on adsorbents, such as carbon molecular sieves.

The use of nitrogen in industrial gas applications has seen significant growth, particularly with the development of non-cryogenic gas mixture separation. A major field of nitrogen separation comprises the separation of nitrogen from air. The removal of nitrogen from air results in an enriched oxygen gas component which is more strongly adsorbed by appropriate carbon molecular sieves which are selective for oxygen adsorption. When nitrogen is desired as a product, typically at elevated pressure, it is desirable to adsorb oxygen from air to result in unadsorbed nitrogen enriched product passing over an oxygen selective carbon molecular sieve adsorbent. The oxygen is then removed during a stage of desorption, typically at lower pressure. This results in nitrogen being recovered at the pressure of the feed air, while oxygen is recovered at a pressure below the feed air pressure. As a result, for the production of nitrogen without significant pressure loss in an adsorptive separation of air, it is desirable to utilize oxygen selective carbon molecular sieve adsorbents for the separation.

In the context of adsorptive air separations using carbon molecular sieves, processes were first described in U.S. Pat. No. 3,801,513. U.S. Pat. No. 4,415,340 discloses an air separation process using carbon molecular sieves in which the initial product from an adsorptive bed just going onstream is recycled to the feed air, upstream of the pump or compressor providing the feed air to the separatory equipment.

Oxygen spiking in nitrogen gas from an air separation process, which was addressed in the above prior art patent, was further addressed in U.S. Pat. No. 4,256,469 which utilizes a relatively slow final repressurization to preclude oxygen spiking when a regenerated adsorption bed goes back on line.

This oxygen spiking was also addressed in U.S. Pat. No. 4,264,339 which provides a continually increasing pressure in an adsorption bed going through the adsorption step in an adsorptive air separation.

U.S. Pat. No. 4,925,461 discloses an adsorptive air separation using carbon molecular sieves wherein after pressure equalization between two adsorption beds, product nitrogen is allowed to backflow into the adsorption bed about to go back on the adsorption step in order to avoid oxygen spiking.

U.S. Pat. No. 4,717,407 in one of its several embodiments discloses a membrane preceding another form of gas separation, such as adsorption. However, the membrane permeates the undesired component for further resolution in the adsorption unit, while the reject is a first desired component stream.

U.S. Pat. No. 4,765,804 discloses that a depressurization gas from an adsorptive separation can be contacted with a membrane with the permeate desired component recycled as feed to the adsorptive separation.

Other patents of general interest to adsorptive separation include U.S. Pat. Nos. 3,738,087; 4,348,213 and 4,853,004.

The prior art has typically relied on slow repressurizations, pressure equalization and depressurization gas permeate recycle steps to provide energy efficiency and high recoveries in adsorptive air separations. Also, high purities in nitrogen product have been attempted by slow repressurizations, product-to-product end equalization of adsorption beds and recycle of initial produced nitrogen product having oxygen spiking. However, the prior art has not resolved the problems of attaining high efficiency, high recovery and high nitrogen purity while avoiding the adsorbent material fluidization and dusting resulting from energy saving pressure equalization. These problems have been overcome by the present invention which is set forth in greater detail below.

BRIEF SUMMARY OF THE INVENTION

The present invention is a pressure swing adsorption process for separating a feed gas containing at least oxygen and nitrogen into more strongly adsorbed oxygen and less strongly adsorbed nitrogen in at least two parallel zones of adsorbent, each zone proceeding through a series of steps out of phase with the other zone comprising;

(a) the feed gas at elevated pressure is contacted with a zone of a carbon molecular sieve adsorbent selective for oxygen, the oxygen is adsorbed and the nitrogen passes out of the zone as a product;

(b) the zone is initially depressurized countercurrently to remove void space gas as depressurization gas, with the depressurization gas recycled to a reservoir at an intermediate pressure and mixed with feed gas;

(c) feed gas and depressurization gas are compressed to the elevated pressure of step (a);

(d) the zone is further depressurized to a lowest pressure by venting to regenerate the adsorbent; and (e) the zone is repressurized to the elevated pressure of step (a) with feed gas and nitrogen.

Preferably, the elevated pressure is in the range of approximately 80 to 135 psig.

Preferably, the reservoir is at a pressure in the range of approximately ¼ to ½ of the elevated pressure.

Preferably, the nitrogen product is produced having a purity of at least 97%.

Preferably, the zone is further depressurized until gas depressurized from the zone has an oxygen content of approximately 21% oxygen.

Preferably, the zone is further depressurized in step (d) counter-currently to the direction of the feed gas flow to the zone.

Preferably, the zone is further depressurized in step (d) to ambient pressure.

Alternatively, the zone is further depressurized in step (d) to subambient pressure by application oil a vacuum to the feed end of the zone.

Preferably, the feed gas initially contacts a membrane selectively permeable to oxygen to increase the nitrogen content of the reject stream and the reject stream is passed to the zone of carbon molecular sieve.

Preferably, the gas depressurized in step (d) is passed over the oxygen permeate side of the membrane as a sweep gas to enhance the permeation of oxygen through the membrane.

DETAILED DESCRIPTION OF THE INVENTION

Figure 1:
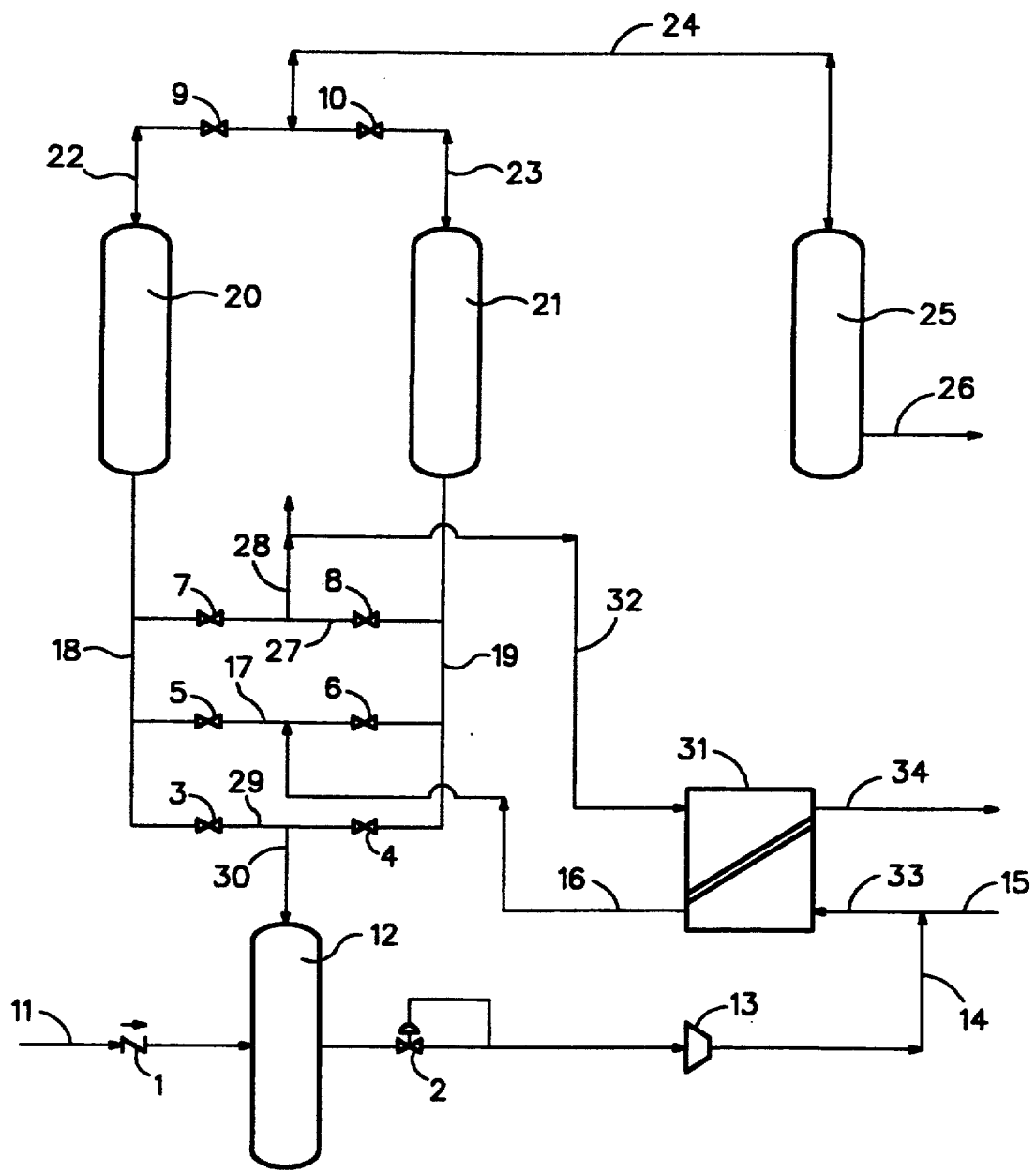
FIG. 1 is a schematic illustration of a preferred embodiment of the present invention comprising a two-adsorption zone pressure swing adsorption process.

This invention relates generally to the separation and purification of gases utilizing pressure swing adsorption (PSA) techniques. Pressure swing adsorption in this context will be construed to include truly superambient pressures, as well as vacuum swing adsorption, which uses in its depressurization stage, potentially, subambient pressures. The present invention relates to a pressure swing adsorption process for the separation of a gaseous mixture and particularly to a process where a gaseous mixture under pressure is conducted over an appropriate adsorbent, capable of adsorbing at least one component of the gaseous mixture selectively over the other components, and this way a gaseous stream enriched in one or several other components is recovered at the outlet of an adsorption zone. The pressure above the adsorbent is then lowered for regenerating purposes so as to liberate a gaseous stream enriched in adsorbed component. The pressure above the adsorbent is then increased and the cycle is repeated.

This present invention is especially suitable in processes where the adsorbent is a carbon molecular sieve and the feed gas mixture is air or a mixture of air and nitrogen enriched gas, wherein nitrogen is recovered as a product at relatively high pressures unadsorbed by the carbon molecular sieve while oxygen can be recovered as a relatively lower pressure product adsorbed by the carbon molecular sieve and released during regeneration at reduced pressure and preferably used as a sweep gas in a membrane unit that increases the nitrogen content of the feed gas and enriches the oxygen content of the oxygen low pressure product. The membrane can be a polyimide, polyamide or polyacrylonitrile, preferably supported on polysulfone, such as is available from Permea, Inc. of St. Louis, Mo. under the trademarked name, PRISM TM membranes.

The pressure swing adsorption process of the present invention includes contacting the feed gas mixture with the adsorbent of an adsorption zone to produce a less strongly adsorbed gas product emanating from the outlet end of the adsorption zone while adsorbing the more readily adsorbed gas component in the adsorbent, such as a carbon molecular sieve in the adsorption zone. Without conducting pressure equalization between parallel adsorption zones, the adsorption zone is vented just after coming off adsorption when the adsorbent is near or completely saturated with the more readily adsorbed gas component. The vented adsorption zone is repressurized with feed gas mixture and/or the less strongly adsorbed gas component, cocurrent and countercurrently, respectively.

The improved aspect of the present invention is the inclusion of a step, after the adsorption/production step and before the final venting step, of countercurrent venting void space gas to a reservoir at an intermediate pressure, where the void space gas is commingled with feed gas mixture. In the case of ambient pressure feed gas mixture, the void space gas and the feed gas mixture are recompressed in a compressor to an elevated pressure for introduction directly into one of several adsorption zones operating in parallel or preferably they are passed over a membrane selective to the permeation of oxygen rather than nitrogen to produce a more nitrogen enriched feed gas as a reject stream. The recycle of the initially vented void space gas from an adsorption zone reduces the feed air requirement and increases the recovery of the less strongly adsorbed component by recycling the depressurization gas or void space gas enriched in the less strongly adsorbed component to the inlet of the feed gas going to the adsorption zone and typically to the feed end of the compressor wherein the recycled void space gas is at higher pressure than the feed gas mixture, thus reducing the demands on the feed compressor and the size of such feed compressor.

Depressurization gas for purposes of this present invention is the void space gas which is the gas that exists in the void space between adsorption particles in an adsorption zone or bed. During adsorption, as a gas mixture passes through the adsorbent particles, gas exists in the interstical spaces between the various adsorbent particles and tends to be slightly enriched in the less strongly adsorbed component of the feed gas mixture. At the end of an adsorption step in which feed gas mixture has been in contact with adsorbent in an adsorption zone, the void space, despite near saturation of the adsorbent with the more strongly adsorbed component, still contains a greater percentage of less strongly adsorbed component than the feed gas mixture, Therefore, recovery of this initial depressurization gas, which comprises the void space gas, is desirable because it will increase the recovery of the less strongly adsorbed component of the feed gas mixture.

Because of its elevated pressure, the recovery of this desirable less strongly adsorbed component-rich void space gas also effects power requirements and capital costs of compressor sizing.

In addition, by venting void space gas to a reservoir, rather than pressure equalizing to a parallel adsorption bed, engineering problems with bed fluidization and adsorbent particle attrition are avoided. This reduces the requirements or the complexity of bed hold-down plates which contain adsorbent particles and the side effects experienced by dusting of adsorbent during multiple cycles of pressure equalization as it occurs in the prior art.

Therefore, in the preferred embodiment of the present invention, the depressurization after adsorption in a pressure swing adsorption separation is conducted in at least two steps or stages, wherein the depressurization of void space gas in the first stage or stages is conducted countercurrently to an intermediate tank or reservoir, and the final stage of depressurization of adsorbed, more strongly adsorbed gas component is conducted to vent to atmospheric pressure or alternatively to subambient pressure by the use of vacuum equipment. Preferably, this final stage depressurization gas is passed as a sweep gas over the permeate side of the semipermeable membrane, which is used to enhance the nitrogen content of the feed gas, prior to venting. The void space gas, enriched in less strong adsorbed component, accumulates in a tank or reservoir and will comprise ¼ to ½ of the maximum bed pressure during the adsorption step or stage. This void space gas is preferably mixed with feed gas mixture in the reservoir to dampen pressure fluctuations and is fed to the inlet of the feed gas mixture compressor, which enables the compressor to compress more mass flow per unit power and increases the recovery of the less strongly adsorbed component, which preferably will be nitrogen in the separation of air. At the same time, higher nitrogen purity gas than air in the tank or reservoir increases the productivity as well as recovery of the preferred pressure swing adsorption process of the present invention when air separation is formed and nitrogen is the less strongly adsorbed component and oxygen is the more strongly adsorbed component. Higher nitrogen purity also results from enhancing the nitrogen content of the feed gas by pretreatment in the oxygen selective membrane.

The present invention will now be described in greater detail with regard to a preferred embodiment illustrated in FIG. 1 wherein air is separated into a less strongly adsorbed nitrogen product of 99.5+% purity and oxygen is vented as a byproduct as the more strongly adsorbed gas component using a carbon molecular sieve adsorbent in two parallel adsorption zones. Feed air in line 11 passes through one-way check valve 1 and enters into the reservoir 12 and is commingled with void space depressurization gas. While the pressure in reservoir 12 is elevated due to the void space gas, feed air will not pass through check valve 1, but as the pressure of the void space gas in reservoir 12 decreases, air will start to pass through check valve 1 and commingle with the remaining void space gas in reservoir 12. The feed air, including any void space gas, passes through valve 2 and is compressed to adsorption pressure in blower or compressor 13. The elevated pressure gas in line 14 can be blended with additional high pressure feed air in line 15 from other sources when dedicated feed air compressor is not available or necessary. The feed air in line 33 can then enter a membrane unit 31 containing a semipermeable membrane which is selective to the permeation of oxygen and rejection of nitrogen. The nitrogen remains on the reject side of the membrane (the side on which the feed gas 33 passes) while oxygen preferentially permeates through the membrane to the permeate side of the membrane (the side on which the stream 32 passes). The selective permeation of oxygen across the membrane is facilitated or assisted by the passage of the lower pressure sweep gas in stream 32 on the permeate side of the membrane. Alternately, the feed gas 33 can omit the membrane unit 31 (not illustrated) and go directly to line 16. The feed gas leaving the membrane unit 31 in line 16 then enters line 17 and passes through one of two valves, which for purposes of the present illustration will be said to be valve 5, while valve 6 is closed. The feed air then passes through manifold 18 and is adsorptively separated on carbon molecular sieve adsorbent in adsorption zone 20 wherein less strongly adsorbed nitrogen passes through the zone 20 as a high purity nitrogen product of at least 97% purity, preferably 99.5+% purity, while oxygen in the feed air is adsorbed in the carbon molecular sieve as a more strongly adsorbed gas component. The nitrogen product passes through line 22 and open valve 9, further passing through line 24 to nitrogen product reservoir 25, which provides for buffering of pressure fluctuations in the pressure swing adsorption process. Nitrogen product is removed for use in line 26.

At an appropriate time, such as potential breakthrough of oxygen in the downstream end of adsorption zone 20 near line 22 or near full saturation of the carbon molecular Sieve with oxygen in adsorption zone 20, the feed of feed air to adsorption zone 20 is discontinued by closing of valve 5. Adsorption zone 20 is depressurized by closing valve 9 and opening valve 3. This allows initial depressurization gas containing void space gas comprising nitrogen-enriched gas existing in the interstitial spaces between adsorption particles to initially be removed countercurrently through line 18, valve 3, line 29 and line 30 to the reservoir 12 for recycle through the process with feed air. After the removal initially by depressurization of the nitrogen enriched void space gas, valve 3 is then closed and valve 7 is opened to vent the remaining gas from adsorption zone 20 through line 27 and vent line 28 comprising residual nitrogen and the bulk of the more strongly adsorbed gas component, oxygen. Alternatively, a vacuum pump can be located at line 28 to perform a vacuum swing adsorption process wherein adsorption zone 20 is evacuated at that time. Preferably, rather than just venting the remaining gas during further depressurization, thins depressurizing gas is passed as a lower pressure sweep gas over the permeate side of the membrane 31 to enhance the driving force to selectively permeate oxygen over nitrogen from the feed gas 33. The venting or sweep gas alternatives can be effected by appropriate valving in lines 28 and 32, although not illustrated.

Upon obtaining good regeneration or removal of more strongly adsorbed oxygen component from adsorption zone 20, valve 7 is closed and adsorption zone 20 is repressurized, preferably with feed gas and nitrogen product simultaneously through open valves 5 and 9. Alternatively, repressurization can be conducted with only feed gas or only product nitrogen or a sequential mixture of both. However, in the preferred embodiment, the repressurization is conducted simultaneously with feed gas and nitrogen product. Nitrogen product repressurization is typically conducted up to the point when the pressure in adsorption zone 20 equalizes with the pressure of the nitrogen product in tank 25, wherein product will initially start to flow through line 22, valve 9, line 24 as the pressure in adsorption zone 20 exceeds the pressure in tank 25.

Figure 3:
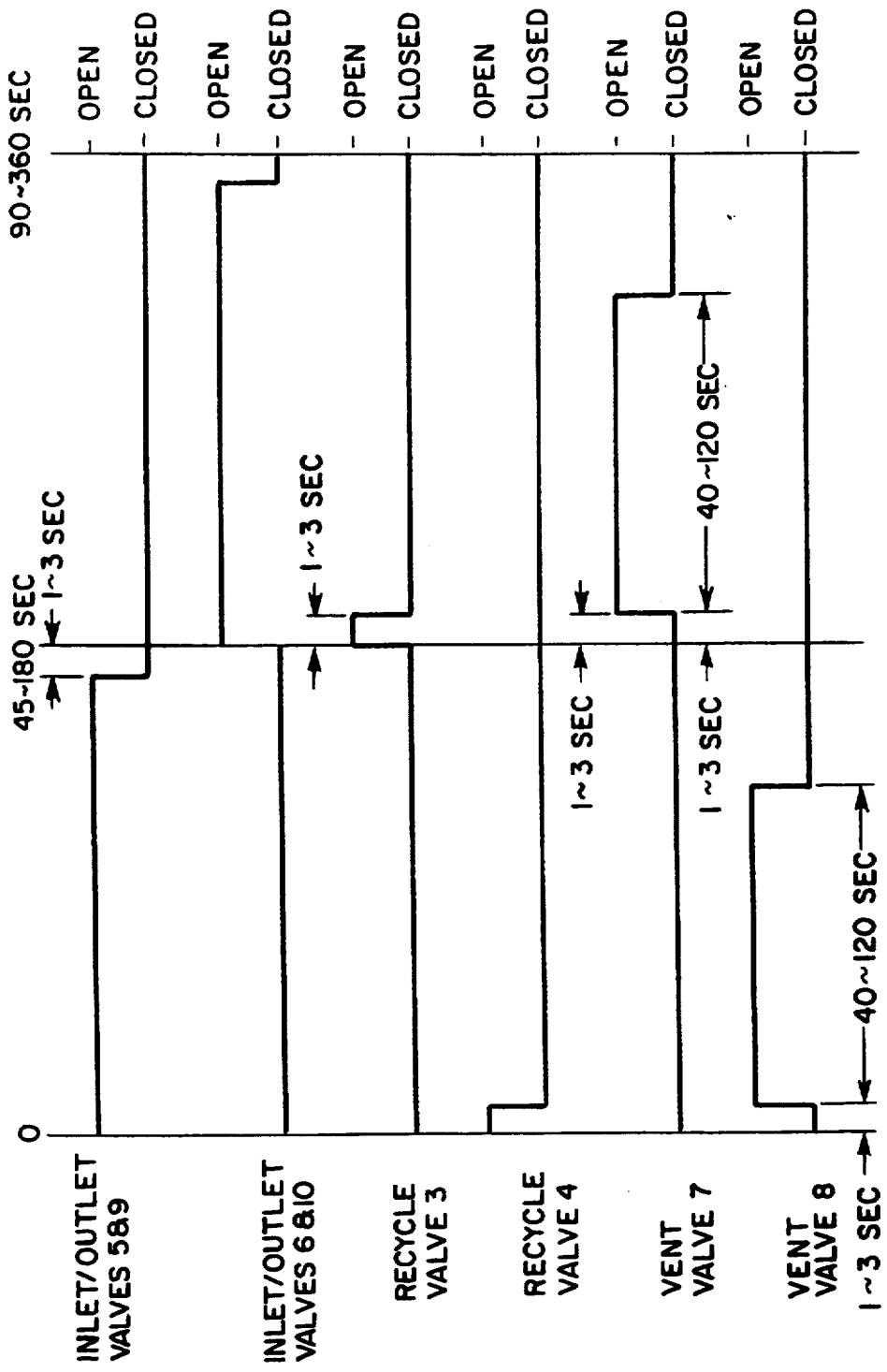
FIG. 3 is a graphic illustration of the operation of the valves of the preferred embodiment of the present invention as set forth in FIG. 1.

Adsorption zone 21 operates through a similar process using line 19 and 23 and valves 4, 6, 8 and 10 as represented in FIG. 3, which shows the operation and the opening and closing of the various valves of the preferred embodiment of the present process.

Figure 2:
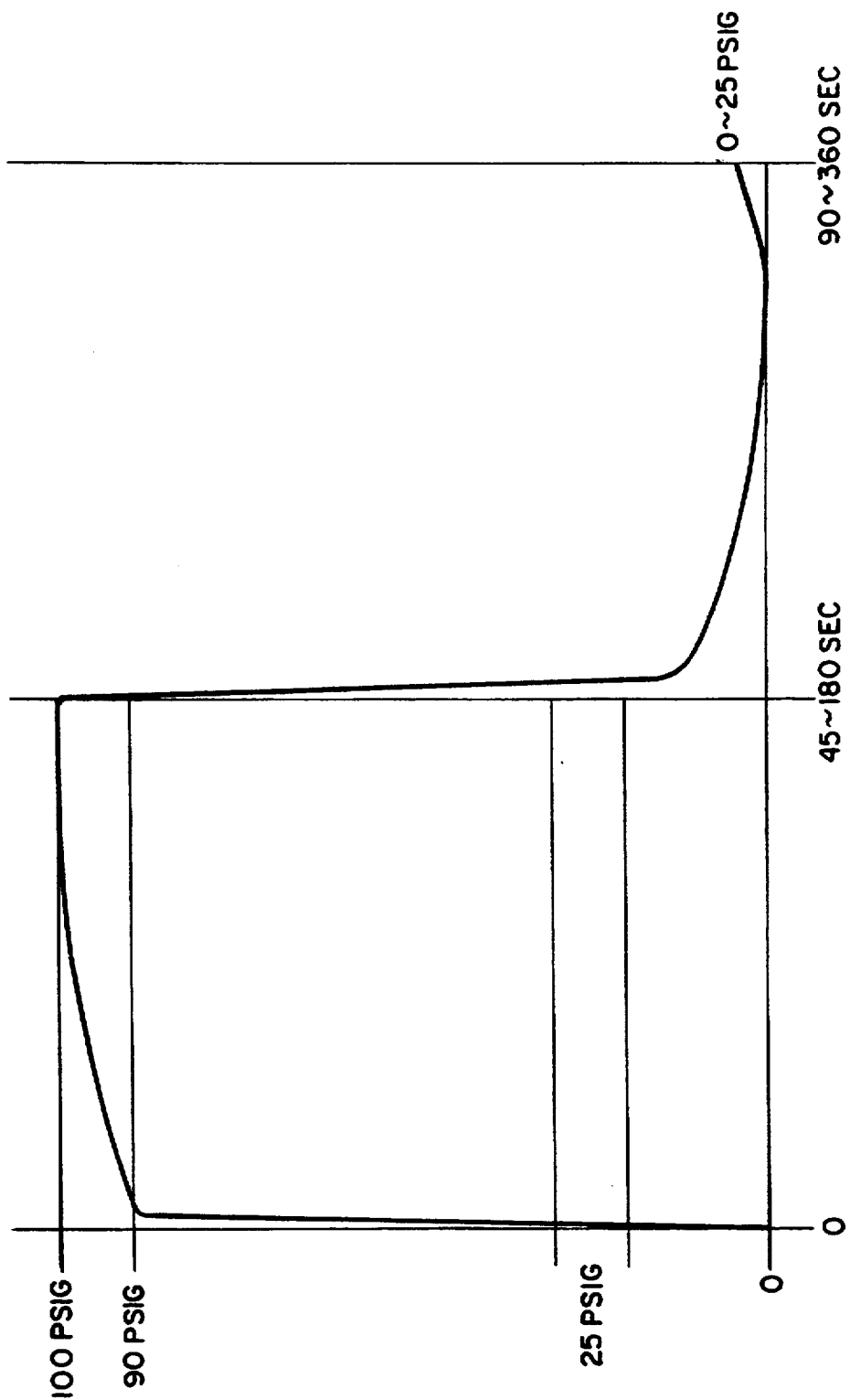
FIG. 2 is a pressure profile of the pressure in either of two-adsorption zones of the preferred embodiment of the present invention as set forth in FIG. 1.

With regard to FIG. 2, the pressure profile of the preferred embodiment of the present invention is identified wherein the maximum pressure is preferably at approximately 100 psig and depressurization is conducted down to approximately ambient pressures. It should be noted that the point of inflection at 90 psig in the adsorption stage, which represents the left hand portion of the graph, is the result of equalization between the appropriate adsorption zone and the nitrogen product tank and does not represent the operation of valves or changing in the stage of repressurization or regeneration. As such, the present invention's repressurization is effectively conducted in a single stage with steady state operation of the apparatus supporting the process operation. The pressure profile of FIG. 2 represents a single cycle for each of the adsorption zones 20 and 21.

In contrast to the prior art, the present invention as set forth with regard to the preferred embodiment described above, provides a number of advantages. For instance, the closing time of both inlet valves 3 and 4 are very short by avoiding the limitations of the prior arts use of equalizing steps. Therefore, the need for a feed gas receiver tank for the compressor is minimized and it reduces compressor power by reducing the pressure buildup during inlet valve closing time. Also, the adsorber pressure prior to venting to atmosphere is lower compared to conventional processes of the prior art which have equalizing steps. Therefore, the present invention reduces the amount of waste gas, which adversely effects recoveries. Additionally, compressor output is increased during a portion of the cycle since the inlet pressure is higher with the recycle of the void space gas than would otherwise be true of feed gas from normal atmospheric air of the prior art processes. The present invention also maintains a clean discharge end of the adsorption zone during the entire cycle because it avoids product to product pressure equalization. Therefore, the present invention increases recovery of nitrogen, particularly when producing the higher nitrogen product levels of 99.5% purity and above. Nitrogen enriched void space gas is recycled in the present invention in contrast to the prior art and this has a major impact on product output and recovery of this process in contrast to the prior art processes. For moderate inlet temperatures, predrying steps are not necessary since the process of the present invention eliminates high inlet flows that occur during pressure equalization of the prior art. In addition, by appropriate alignment of the equipment of the present invention, high velocity flows which occur during void space depressurization and venting occur in potentially a downward direction only which avoids adsorbent particle fluidization in the adsorption zones and avoids various hold-down requirements for adsorption particles that otherwise need to be considered in dual end pressure equalization of the prior art. The use of a semipermeable oxygen selective membrane to further nitrogen enrich the feed gas with the assistance of a sweep gas comprising the gas that would otherwise be directly vented also enhances the process in a novel way. All of these enumerated advantages represent the unexpected and surprising distinction of the present invention from the prior art adsorptive separation processes for gas separations.

In those instances where the feed gas mixture is an already elevated pressure gas, such as feed air from some plant source, a small compressor could be placed in line 30 and the larger compressor 13 could be dispensed with. Again, it is possible to conduct a vacuum swing process by merely providing vacuum pump equipment in line 28 rather than the preferred venting to atmospheric or ambient pressure conditions.

The present invention has been set forth with regard to a specific preferred embodiment. However, the full scope of the present invention should be ascertained from the claims which follow.

I claim:

1. A pressure swing adsorption process for separating a feed gas containing at least nitrogen and oxygen into more strongly adsorbed oxygen and less strongly adsorbed nitrogen in at least two parallel zones of adsorbent, each zone proceeding through a series of steps out of phase with the other zone comprising;
   (a) said feed gas at elevated pressure is contacted with a zone of a carbon molecular sieve adsorbent selective for oxygen, the oxygen is adsorbed and the nitrogen passes out of said zone as a product;
   (b) said zone is initially depressurized countercurrently to remove void space gas and adsorbed gas as depressurization gas, with said depressurization gas recycled to a reservoir at an intermediate pressure and mixed with feed gas;
   (c) said feed gas and depressurization gas are compressed to said elevated pressure of step (a);
   (d) said zone is further depressurized to a lowest pressure by venting to regenerate said carbon molecular sieve adsorbent; and,
   (e) said zone is repressurized to said elevated pressure of step (a) with feed gas and nitrogen.

2. The process of claim 1 wherein said elevated pressure is in the range of approximately 80 to 135 psig.

3. The process of claim 1 wherein said reservoir is at a pressure in the range of approximately one quarter to one half of said elevated pressure.

4. The process of claim 1 wherein a nitrogen product is produced having a purity of at least 97%.

5. The process of claim 1 wherein said zone is further depressurized until gas depressurized from the zone has an oxygen content of approximately 21% oxygen.

6. The process of claim 1 wherein said zone is further depressurized in step (d) countercurrently to feed gas flow to said zone.

7. The process of claim 1 wherein said zone is further depressurized in step (d) to ambient pressure.

8. The process of claim 1 wherein said zone is further depressurized in step (d) to subambient pressure by application of a vacuum to a feed end of said zone.

9. The process of claim 1 wherein said feed gas initially contacts a membrane selectively permeable to oxygen to increase the nitrogen content of said feed gas as a reject stream and said reject stream is passed to said zone of carbon molecular sieve as the feed gas.

10. The process of claim 9 wherein gas depressurized in step (d) is passed over an oxygen permeate side of said membrane as a sweep gas to enhance permeation of oxygen through said membrane.

11. A pressure swing adsorption process for separating a feed gas containing nitrogen and oxygen into more strongly adsorbed oxygen and less strongly adsorbed nitrogen in at least two parallel zones of adsorbent, each zone proceeding through a series of steps out of phase with the other zone comprising;
   (a) said feed gas initially contacts a membrane selectively permeable to oxygen to increase the nitrogen content of said feed gas as a reject stream;
   (b) said reject stream at elevated pressure is contacted with a zone of a carbon molecular sieve adsorbent selective for oxygen, the oxygen is adsorbed and the nitrogen passes out of said zone as a product;

(b) said zone is initially depressurized countercurrently to remove void space gas and adsorbed gas as depressurization gas, with said depressurization gas recycled to a reservoir at an intermediate pressure and mixed with feed gas;
(c) said feed gas and depressurization gas are compressed to said elevated pressure of step (b);
(d) said zone is further depressurized to a lowest pressure to regenerate said carbon molecular sieve adsorbent and the resulting gas released during further depressurization is passed over an oxygen permeate side of said membrane as a sweep gas to enhance permeation of oxygen through said membrane; and,
(e) said zone is repressurized to said elevated pressure of step (b) with feed gas and nitrogen.

* * * * *